United States Patent [19]

Rinke

[11] Patent Number: 5,738,313
[45] Date of Patent: Apr. 14, 1998

[54] CABLE HOLDER

[76] Inventor: Alvin F. Rinke, 9124 Lambs, Goodells, Mich. 48027

[21] Appl. No.: 605,354

[22] Filed: Feb. 22, 1996

[51] Int. Cl.⁶ ................................................ F16L 3/08
[52] U.S. Cl. ........................ 248/74.2; 248/75; 248/211
[58] Field of Search ................................ 248/74.2, 61, 79, 248/77, 75, 210, 65, 218.4, 214, 230.7, 231.81, 229.16, 229.26, 304, 305, 211

[56] References Cited

U.S. PATENT DOCUMENTS

| | | | |
|---|---|---|---|
| 1,527,980 | 3/1925 | Jones et al. | 248/211 |
| 2,524,875 | 10/1950 | Beaver | 248/211 |
| 2,542,737 | 2/1951 | Vogel | 248/211 |
| 3,312,441 | 4/1967 | Molenda | 248/210 |
| 3,536,287 | 10/1970 | Kramer | 248/301 |
| 4,429,848 | 2/1984 | Gunsolus | 248/75 |
| 4,433,822 | 2/1984 | Caggiano | 248/210 |
| 4,709,888 | 12/1987 | Cubit et al. | 248/73 |
| 5,007,605 | 4/1991 | Horvath | 248/62 |
| 5,054,581 | 10/1991 | Henson | 248/210 |
| 5,062,607 | 11/1991 | Kisner | 248/211 |
| 5,133,525 | 7/1992 | Good | 248/210 |

*Primary Examiner*—Leslie A. Braun
*Assistant Examiner*—Anita M. King
*Attorney, Agent, or Firm*—Gifford, Krass, Groh, Sprinkle, Patmore, Anderson & Citkowski, P.C.

[57] ABSTRACT

A cable holder is disclosed for use in conjunction with a boat having a deck handrail and at least one support rail extending downwardly from and supporting the handrail. A cable holder includes an elongated body having a first and second end. A first hook is formed on the first end of the body which is dimensioned to fit over and be secured to the top rail of the boat. A second hook is formed on the second or opposite end of the body and is dimensioned to receive and support electrical cables of the type commonly used to electrically power boats when they are docked. A third hook is secured to a midpoint of the body and is dimensioned to releasably lock onto the support rail of the boat to prevent dislodgement of the cable holder from the boat rail. A fourth hook is optionally secured to the body to carry still further electrical lines, such as telephone lines and television cables.

8 Claims, 1 Drawing Sheet

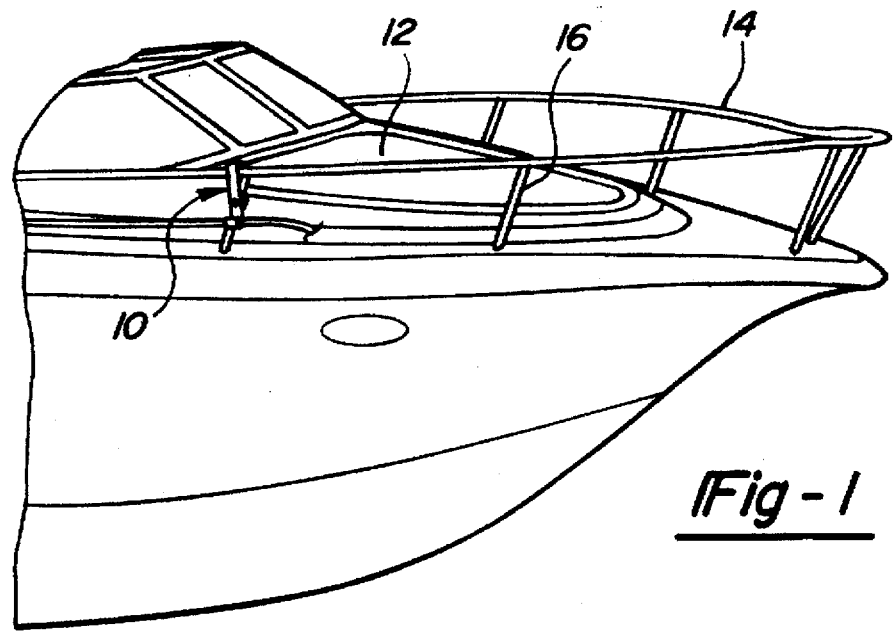
*Fig - 1*
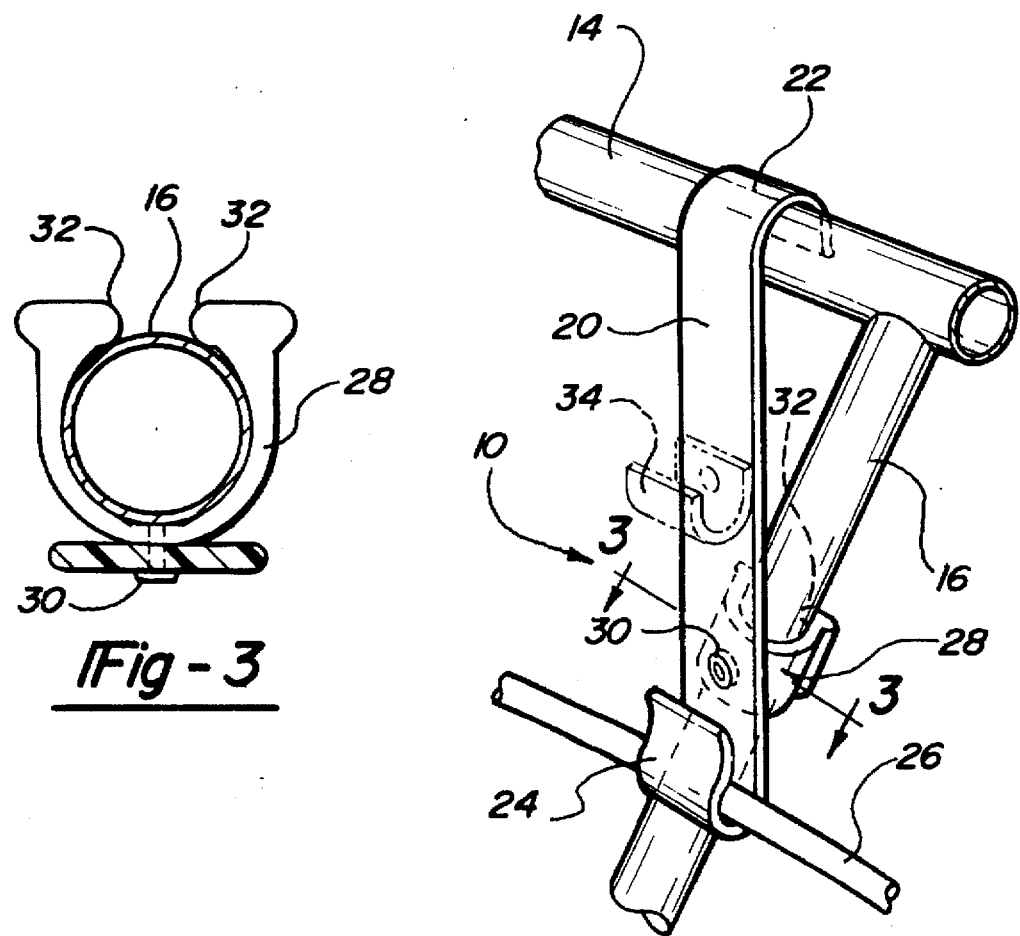
*Fig - 3*
*Fig - 2*

5,738,313

CABLE HOLDER

BACKGROUND OF THE INVENTION

1. Field of the Invention

The present invention relates generally to cable holders and, more particularly, to a cable holder particularly designed for a boat.

2. Description of the Prior Art

When pleasure boats are docked at marinas, privately owned docks and the like, the engines to the boats are turned off which simultaneously stops the electrical generators commonly connected to the boat engines. Consequently, in order to provide power to the boat, electrical cables are typically electrically connected from the marina to the appropriate electrical receptacle on the boat. Other electrical cables, such as telephone and television cables, are also oftentimes provided by the marina for connection with its docked boats.

One disadvantage of this previously known practice for providing electrical power and other electrical services to boats while they are docked is that the electrical cables are typically strewn on the dock or on the deck of the boat. As such, these cables provide a safety hazard for people walking on the dock and/or boat deck. Furthermore, when these previously known electrical cables are merely strewn across the boat deck or on the dock, they may fall into the water and create a potential safety hazard.

SUMMARY OF THE PRESENT INVENTION

The present invention provides a cable holder for boats which overcomes all of the above-mentioned disadvantages of the previously known practices.

The cable holder of the present invention comprises an elongated body having a U-shaped hook at both its first and second ends. The first hook at the first end of the body is dimensioned to fit over and be supported by the deck handrail on the boat so that the body depends downwardly from the deck handrail. Conversely, the second hook at the second or lower end of the body is dimensioned to receive and support electrical cables of the type which provide power from the boat marina to docked boats.

In order to prevent dislodgement of the cable holder from the boat and rail, a third hook is secured to a midpoint of the body. This third hook is generally U-shaped in cross section and is dimensioned to releasably lock onto a support rail extending between the boat deck and the boat top rail. Since the support rails may extend at any of a number of angles relative to the top rail, the third hook is preferably swivelly mounted to the body to thus accommodate different types of support rails.

Optionally, a fourth hook is secured to the body at a position spaced upwardly from the second hook. This fourth hook is dimensioned to receive and support further electrical cables, such as telephone cables, television cables and the like.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a perspective view illustrating the operation of the preferred embodiment of the present invention;

FIG. 2 is an elevational view illustrating the preferred embodiment of the present invention; and FIG. 3 is a sectional view taken substantially along line 3—3 in FIG. 2.

DETAILED DESCRIPTION OF A PREFERRED EMBODIMENT OF THE PRESENT INVENTION

With reference first to FIG. 1, a preferred embodiment of the cable holder 10 of the present invention is there shown for use in conjunction with a boat 12. As is conventional, the boat 12 includes a handrail 14 which extends around its deck. The handrail 14, furthermore, is supported at a position spaced above the deck by a plurality of support rails 16. The support rails 16 may be either perpendicular or angled with respect to the handrail 14.

With reference to FIGS. 1 and 2, the cable holder 10 includes an elongated body 20 having a first hook 22 at a first end and a second hook 24 at a second end. Both hooks 22 and 24 are generally U-shaped in cross section and are of a one piece construction in conjunction with the body 20.

As best shown in FIG. 2, the first hook 22 is dimensioned to fit over and be supported by the handrail 14 of the boat. In doing so, the body 20 as well as the second hook 24 depend downwardly from the handrail 14.

Still referring to FIG. 2, the first hook 22 and second hook 24 preferably extend outwardly from opposite sides of the body 20. Furthermore, the second hook 24 is dimensioned to receive and support electrical power cables 26 of the type used in marinas to provide electrical power to docked boats.

The body 20 as well as the hooks 22 and 24 are made of an electrical insulating material, such as plastic, in order to prevent any possibility of electricity being conducted from the cable 26 to the top of handrail 14. Other types of insulating materials, such as nylon and the like, may alternatively be used.

Referring now particularly to FIGS. 2 and 3, the cable holder 10 further includes a third hook 28 which is generally U-shaped in cross section. The third hook 28 is swivelly connected to the body 20 by a pin 30, such as a rivet, at a midpoint of the body 20. As best shown in FIG. 3, the third hook 28 is dimensioned to lockingly receive the support rails 16 from the boat 12. Since the support rail 16 may be either perpendicular or angled with respect to the rail 14, the swivel connection provided by the pin 30 between the body 20 and the third hook 28 enables the third hook 28 to register with and receive the support rail 16 regardless of the angle between the support rail 16 and the boat handrail 14.

Still referring to FIG. 3, the third hook 28, like the body 20 and hooks 22 and 24, is made of an electrical insulating material, such as plastic. Additionally, the third hook 20 includes inwardly extending lips 32 which are spaced apart from each other by a distance less than the diameter of the support rail 16. Thus, when the third hook 28 is pushed onto a support rail 16, the third hook 28 flares outwardly and then snaps around the support rail 16 in order to firmly, but releasably, secure the cable holder 10 to the boat against unintended dislodgement.

Referring now especially to FIG. 2, the cable holder 10 optionally includes a fourth hook 34 secured to a midpoint of the body 20 on the side opposite from the third hook 28. This fourth hook 34 is generally U-shaped and is dimensioned to receive and support still further electrical cables, such as telephone lines, television cables and the like, that are provided at some marinas.

The cable holder of the present invention advantageously maintains the cables of the type found in marinas off of not only the docks but also the boat decks. As such, the cable holder of the present invention eliminates a potentially dangerous situation at marinas.

Having described by invention, however, many modifications thereto will become apparent to those skilled in the art to which it pertains without deviation from the spirit of the invention as defined by the scope of the appended claims.

I claim:

1. For use in conjunction with a boat having a deck hand rail and at least one support rail extending downwardly from and supporting the hand rail, a cable holder comprising:

an elongated body having a first end and a second end, said body having a first side and a second side, said first side being opposite from said second side, a first hook formed on said first end of said body so that said first hook extends outwardly from said first side of said body, said first hook adapted to receive the top rail, a second hook on said second end of said body so that second hook extends outwardly from said second side of said body, said hook adapted to receive and support at least one electric cable, a third hook secured to a midpoint of said body, said third hook extending outwardly from said first side of said body, said third hook adapted to releasably engage and lock onto the support rail;

a fourth hook secured to a midpoint of said body at a position spaced from said second hook, and wherein said fourth hook is on a side of said body opposite from said third hook.

2. The cable holder as defined in claim 1 wherein said first and second hooks are generally U-shaped.

3. The cable holder as defined in claim 1 wherein said third hook is generally U-shaped.

4. The cable holder as defined in claim 3 and comprising means for swivelly mounting said third hook to said body.

5. The cable holder as defined in claim 1 wherein said body and said first and second hooks are of a one piece construction.

6. The cable holder as defined in claim 5 wherein said body and said first and second hooks are made of plastic.

7. The cable holder as defined in claim 6 wherein said third hook is made of plastic.

8. The cable holder as defined in claim 4 wherein said swivelly mounting means comprises a rivet.

* * * * *

UNITED STATES PATENT AND TRADEMARK OFFICE
CERTIFICATE OF CORRECTION

PATENT NO. : 5,738,313

DATED : April 14, 1998

INVENTOR(S) : Alvin F. Rinke

It is certified that error appears in the above-identified patent and that said Letters Patent is hereby corrected as shown below:

Column 3, line 20, before "second", first occurrence, insert --said--.
Column 3, line 21, before "hook" insert --second--.

Signed and Sealed this

Sixth Day of October, 1998

*Attest:*

BRUCE LEHMAN

*Attesting Officer*  *Commissioner of Patents and Trademarks*